United States Patent [19]

Eigenbrode et al.

[11] Patent Number: 5,799,874
[45] Date of Patent: Sep. 1, 1998

[54] AERODYNAMICALLY CONTROLLED EJECTOR

[75] Inventors: Daniel E. Eigenbrode, Hobe Sound, Fla.; Robert E. Field, Sycamore, Ill.

[73] Assignee: United Technologies Corporation, Hartford, Conn.

[21] Appl. No.: 565,600

[22] Filed: Nov. 30, 1995

[51] Int. Cl.⁶ ............................................. B64D 33/04
[52] U.S. Cl. ............................ 239/127.1; 239/127.3; 239/265.17; 239/265.37; 60/230
[58] Field of Search ..................... 239/127.1, 127.3, 239/265.17, 265.35, 265.37, 265.39; 60/230; 137/615, 891

[56] References Cited

U.S. PATENT DOCUMENTS

| | | | |
|---|---|---|---|
| 2,699,647 | 1/1955 | Goebel | 239/127.1 |
| 3,032,974 | 5/1962 | Meyer | 239/127.3 |
| 3,144,752 | 8/1964 | Kepler | 239/265.17 |
| 3,325,103 | 6/1967 | Abbott | 239/265.17 |
| 3,371,491 | 3/1968 | Pinter | 60/230 |
| 3,409,228 | 11/1968 | Mehr | 239/127.3 |
| 3,463,402 | 8/1969 | Langston, Jr. | 239/127.3 |
| 3,467,312 | 9/1969 | Mehr | 234/127.3 |
| 3,660,982 | 5/1972 | Gozlan | 60/230 |
| 4,230,286 | 10/1980 | Warburton | 239/265.17 |
| 4,544,098 | 10/1985 | Warburton | 239/127.3 |
| 4,690,329 | 9/1987 | Madden | 239/265.19 X |
| 5,255,849 | 10/1993 | Mayer et al. | 239/127.3 |
| 5,335,489 | 8/1994 | Thayer | 60/230 |
| 5,577,381 | 11/1996 | Eigenbrode et al. | 60/226.1 |

*Primary Examiner*—Andres Kashnikow
*Assistant Examiner*—Lisa Ann Douglas
*Attorney, Agent, or Firm*—Norman Friedland

[57] ABSTRACT

The supersonic ejector utilized for cooling includes a cooling extension axially extending the discharge slot from the throat of the primary stream and is contoured to accelerate primary stream, to direct the primary stream to flow parallel to the secondary stream and match the static pressures of both streams and to ensure that the expansion shocks are upstream of the discharge slot. This supersonic ejector is utilized in one instance for cooling purposes in a two-dimensional vectoring nozzle of a gas turbine engine powering aircraft.

7 Claims, 3 Drawing Sheets

AERODYNAMICALLY CONTROLLED EJECTOR

This invention was made under a United States Government contract and the Government has an interest herein.

DESCRIPTION

1. Cross Reference

This invention relates to the subject matter disclosed in U.S. Patent Application filed in the United States Patent and Trademark Office on Nov. 13, 1995 by George P. Liang, William J. Yeager and John F. Soileau entitled "Ejector Extension Cooling for Exhaust Nozzle" and commonly assigned to United Technologies Corporation.

2. Technical Field

This invention relates to ejectors and particularly to supersonic ejectors and supersonic ejectors used in cooling of gas turbine engine and/or aircraft components and particularly to extension means for controlling the primary stream to flow parallel to and static pressure match the secondary stream when they meet and to control the expansion and shock waves in supersonic ejectors for ejector cooling performance improvements.

3. Background Art

As it is well known in the cooling technology for gas turbine engines and particularly in the area of exhaust nozzle cooling, ejectors have been employed to either utilize the fan discharge air or compressor air or the main engine gas stream as the primary ejector air stream, and ram air, compressor air or fan air as the secondary ejector air stream.. For example, U.S. Pat. No. 5,255,849 granted to Mayer et al on Oct. 26, 1993 entitled "Cooling Air Transfer Apparatus For Aircraft Gas Turbine Engine Exhaust Nozzles" discloses an ejector that utilizes the cooling air that is discharged from the augmentor as the primary stream and nacelle bay air as the secondary stream for cooling the divergent flaps and seal of the exhaust nozzle. U.S. Pat. No. 5,335,489 granted to Thayer on Aug. 9, 1994, on the other hand, discloses an ejector for an exhaust nozzle that utilizes the engine's main gas stream as the primary stream pumping the secondary stream of nacelle bay area ram air to cool the divergent flap of the nozzle. Hence, it is quite evident that the particular source of gases utilized in the ejector is predicated on what gases are available, and how complex, heavy and costly it would be to provide the hardware to meet the cooling requirements.

Obviously, looking at the characteristics of an ejector, it will be appreciated that an ejector nozzle simply accelerates the high pressure primary stream to a supersonic velocity prior to introducing the low pressure secondary stream. The action of the primary stream, through local over-expansion and momentum exchange, induces secondary flow in the area between the primary jet and the shroud. As is well know to one skilled in this art, the primary nozzle throat to shroud area ratio and the divergence angle of the shroud are important parameters in the design of ejectors. For example, when the purpose of the ejector is to pump large quantities of the secondary fluid, the area ratio/divergent angle is large. If the purpose of the ejector is to pump smaller amounts of secondary fluid the shroud area ratio/divergence angle is minimized. In an aircraft engine exhaust nozzle for aircraft environment the velocity of the exhaust gases at the throat of the nozzle are choked at Mach 1 and increase to higher Mach Numbers downstream of the throat, it follows that as the velocity of the primary stream increases, the primary stream evidences a decrease in static pressure. Static pressure immediately downstream of the injection point is significantly less than that of the primary gas stream. This is due to Prandtl Meyer expansion of the primary gas stream. This local low pressure region allows the secondary air to enter the shroud. When using secondary air as a cooling buffer for the shroud walls, it is preferable to balance the secondary fluid pressure with the primary fluid pressure to eliminate excessive mixing. Since the secondary fluid is typically air that hasn't been involved in cycle process of the gas turbine engine, it has very low pressure. To provide the desired pressure balance between the primary stream and the secondary stream therefore, the primary gas stream's velocity must be increased so as to decrease its static pressure. This is accomplished by introducing a large divergent angle in the shroud adjacent the discharge slot of the ejector. However, increasing the shroud divergent angle inherently decreases the nozzle thrust coefficient, which is undesirable. Hence, a designer would like to design the ejector to maximize the primary stream velocity at the secondary fluid injection site of the nozzle and also minimize the overall shroud divergence to maintain thrust coefficient. But as was described in the immediate above paragraph, these parameters are contrary to the design of typical ejector nozzles. Thus it would be desirable to maintain a high thrust coefficient by minimizing the shroud divergence which requires an elimination of the divergent angle and at the same time increase the velocity of the engine main gas stream at the ejection site.

As is well known in this technology, it is abundantly important to utilize the ejector in the most efficient manner so that the amount of cooling air utilized for cooling will be the least amount possible to obtain the desired cooling while limiting the deficit to the engine's performance. To this end the configuration of the ejector is designed in accordance with this invention, to maximize the thrust coefficient and pumping effectiveness of the ejector by adding an extension to the ejector and judiciously shaping the extension to turn the flow of the primary gas stream and control the position of the resulting shock system so they occur upstream of the injection location and do not degrade cooling performance.

SUMMARY OF THE INVENTION

An object of this invention is to provide an improved supersonic ejector.

A feature of this invention is to improve ejector performance of a supersonic ejector that includes a throat area for choking the primary flow stream and providing an extension with a specific configuration so that the static pressure of the primary stream matches the secondary stream and both streams are parallel when they come together at the design conditions and to ensure the shock system associates with turning the main gas flow occurs upstream of the secondary injection location.

A feature of this invention is the improved supersonic ejector with an extension is to contour the extension so that the primary jet at the design conditions evidences an isentropic expansion.

A still further feature of this invention is to provide for a supersonic ejector an extension whose length is determined by the recompression shock such that the recompression shock is maintained within the extension.

The foregoing and other features of the present invention will become more apparent from the following description and accompanying drawings.

DETAILED DESCRIPTION OF THE PREFERRED EMBODIMENT

As this invention constitutes an improvement over the supersonic ejector disclosed in U.S. Patent Application noted in the Cross Reference, the preferred embodiment for the sake of convenience and simplicity describes the contour and the extension of the primary jet of the ejector and the invention utilized in a vectoring exhaust nozzle of a gas turbine engine. For the details of an ejector and a vectoring nozzle reference should be made to U.S. Pat. No. 5,335,489 granted to E. B. Thayer on Aug. 9, 1994 entitled "Gas Turbine Vectoring Nozzle" commonly assigned to the assignee of this application which is incorporated herein by reference.

Suffice it to say that the supersonic ejector in one embodiment is utilized for cooling the shroud surfaces of the variable throat axisymmetric or two-dimensional vectoring or non-vectoring nozzles by pumping flow from the secondary stream of ram air by use of the engine's exhaust gases primary stream. It will be understood that the ejector of this invention can be utilized in any number of applications including non-aeronautical applications.

Figure 1:
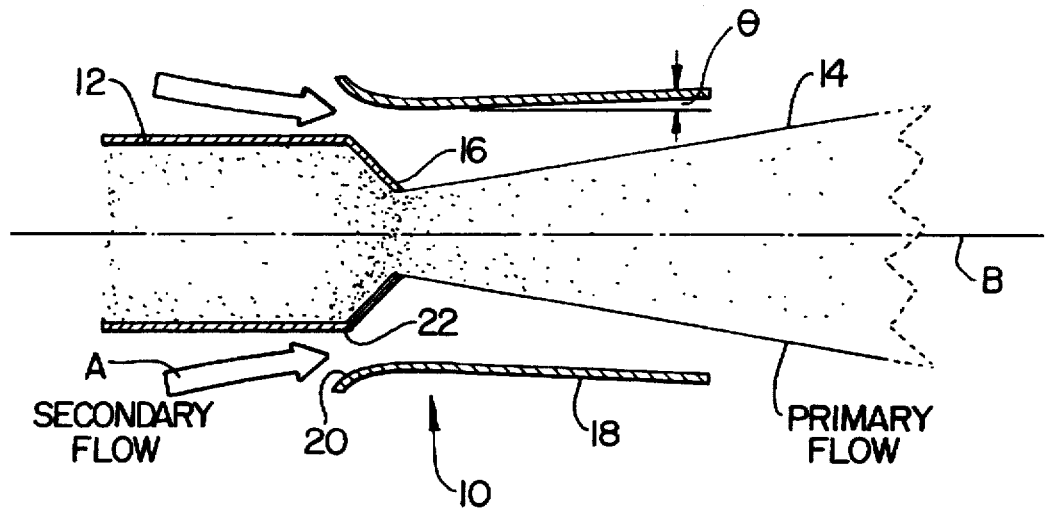
FIG. 1 is a schematic illustrating a prior art supersonic ejector.

Referring next to the prior art ejector generally indicated by reference numeral 10 shown schematically in FIG. 1 as having a primary nozzle 12 for flowing primary jet stream 14 through the orifice 16. The shroud 18 surrounding the tip of nozzle 12 defines with the nozzle 12 an opening or slot 20 for flowing the secondary flow indicated by arrow A. The supersonic stream 14 is accelerated by the primary nozzle 12 and discharges the stream as a jet into the shroud 18. The action of the primary stream, through local expansion characteristics and momentum exchange, induces secondary flow A in the area between the primary jet 14 and the shroud 18. As one skilled in this art will appreciate the primary nozzle 12 defines with shroud 18 throat 16 and the ratio of throat to shroud area and the divergence angle θ of shroud 18 relative to the center line B of the orifice 16 are important parameters that are taken into consideration in designing the ejector. If the purpose of the ejector is to pump large quantities of the secondary fluid the area ratio/divergence angle is large. If the ejector requirement is only to pump small amounts of secondary fluid the area ratio\divergence angle is held small.

As mentioned earlier, this invention has application in both of the above situations as it improves the operating characteristics and efficiency of the ejector when the ejector is designed with either the small or large area ratio/ divergence angle. Also well known in this art is that a supersonic ejector nozzle when operating at conditions different from those for which it was designed will experience substantial performance penalties caused by non-ideal expansion of the primary flow. When the primary fluid is a gas with a supply pressure operating at supersonic speed, the expansion process is especially critical.

Figure 2:
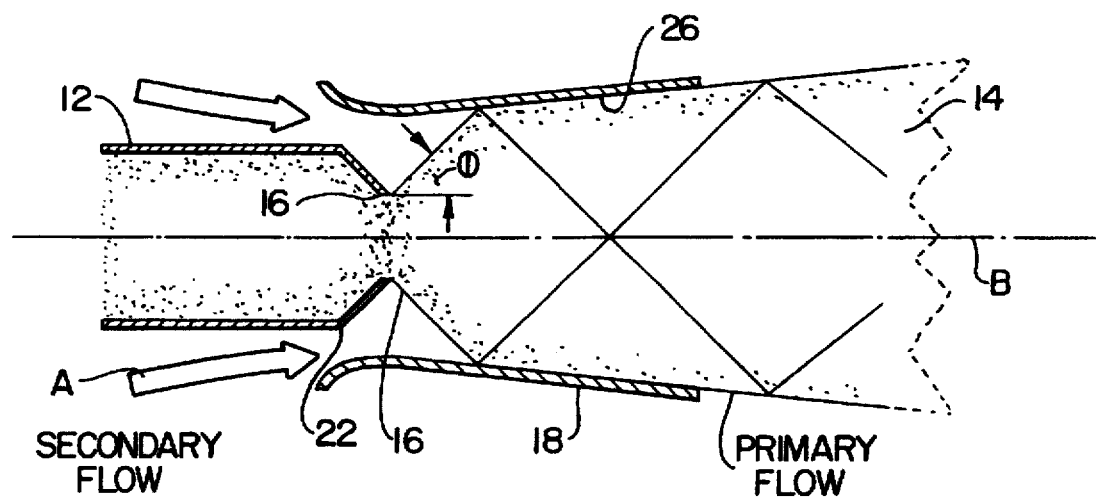
FIG. 2 is a schematic illustrating a prior art supersonic ejector showing the effect of the shock waves when no extension is utilized.

As shown in the prior art ejector 10 (all reference numerals depict like elements in all the Figs.) in FIG. 2 either excess pressure in the primary fluid or a pressure of the secondary fluid below the design conditions will cause the primary jet 14 to expand to an increased angle of expansion Φ. As is apparent from FIG. 2 the primary jet adjacent throat 16 will impinge on the inner surface 26 of shroud 18 causing the pumping of the secondary flow to either subside or cease.

Figure 3:
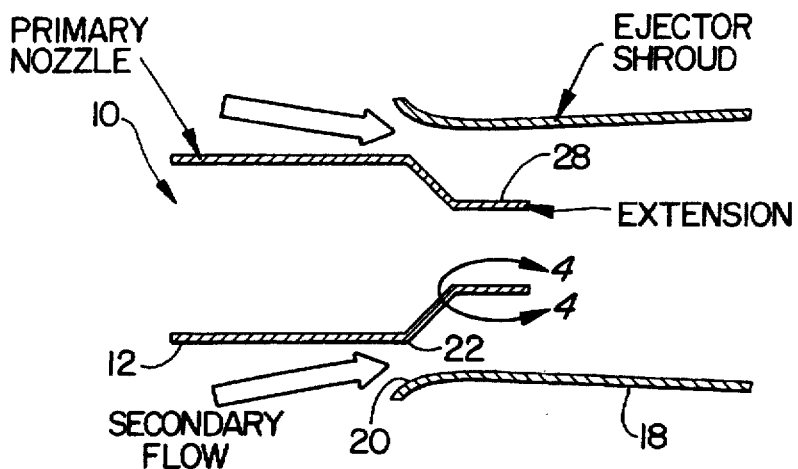
FIG. 3 is a schematic illustration a prior art supersonic ejector with an extension.
Figure 4:
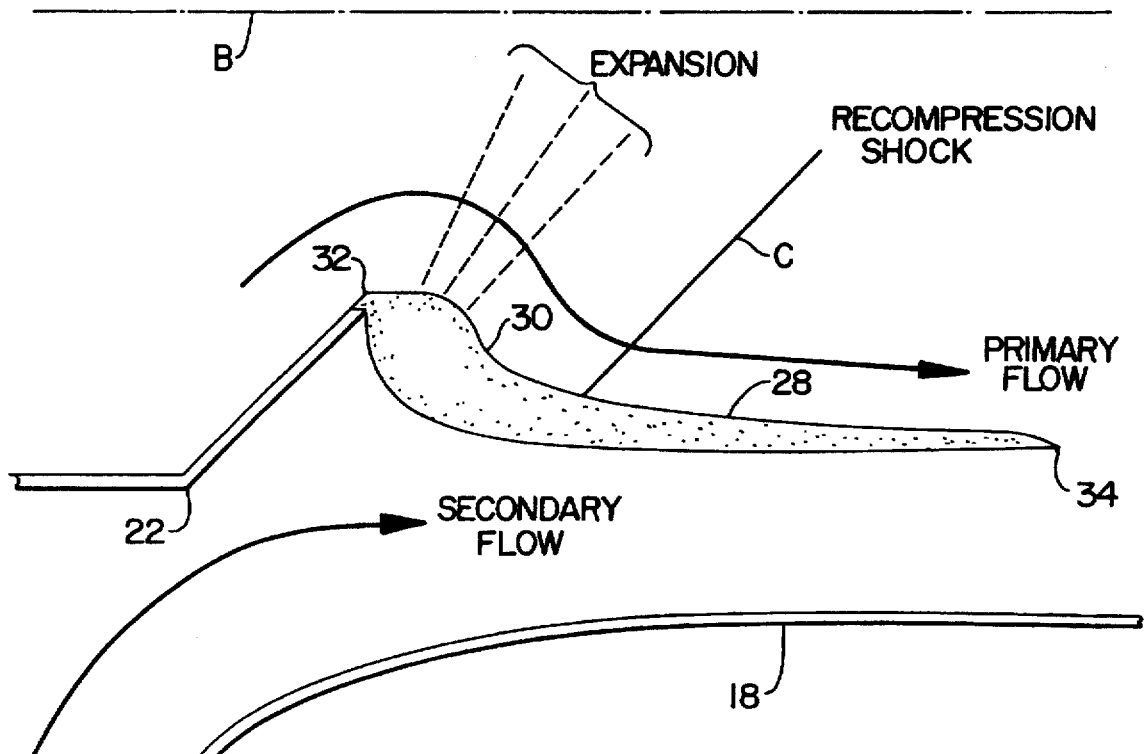
FIG. 4 is an enlarged schematic illustration of the extension taken along 3—3 of FIG. 3 showing the inventive contour thereof.

Reference is next made to FIGS. 3 & 4 which schematically illustrate this invention. While extensions to ejectors are shown in the prior art this extension is designed in accordance with this invention to prevent the attachment of the primary flow jet 14 to the inner surface 26 of shroud 18 to enhance ejector performance and extend the operational range of the ejector nozzle. The extension 28 which is tubular in shape is affixed to the end of orifice 16 and is contoured as will be described immediately below.

As is apparent from an inspection of FIG. 4, the extension 28 is contoured into a configuration 30 that will provide an isentropic expansion of the primary jet 14 at the design conditions. This insures that at the end of the extension where the primary and secondary flow streams first come in contact the primary and secondary fluid velocities will be parallel and the static pressures of each will closely match each other. For conditions other than the design point (off-design) an expansion with the associated turning of the primary jet flow will be induced near the leading edge 32 of extension 28 and a recompression shock C will be present further down the extension 18 to turn the primary flow back where it will again be parallel to the secondary flow stream. The overall length of extension 18 is determined by requiring the recompression shock to reside on the extension. In accordance with this invention, the recompression shock can not be allowed to form downstream of the extension trailing edge 34 for any off-design conditions where ejector performance is critical. Contouring the primary nozzle throat extension 28 in accordance with this invention allows proper aerodynamic control of the primary jet expansion and recompression shock characteristics.

As is apparent from the foregoing, by properly contouring the extension, provides for the designer of ejectors mechanism to easily optimize ejector nozzles for their design conditions and to enhance ejector nozzle performance and significantly increase their operational range particularly by improving the off-design performance.

Figure 5:
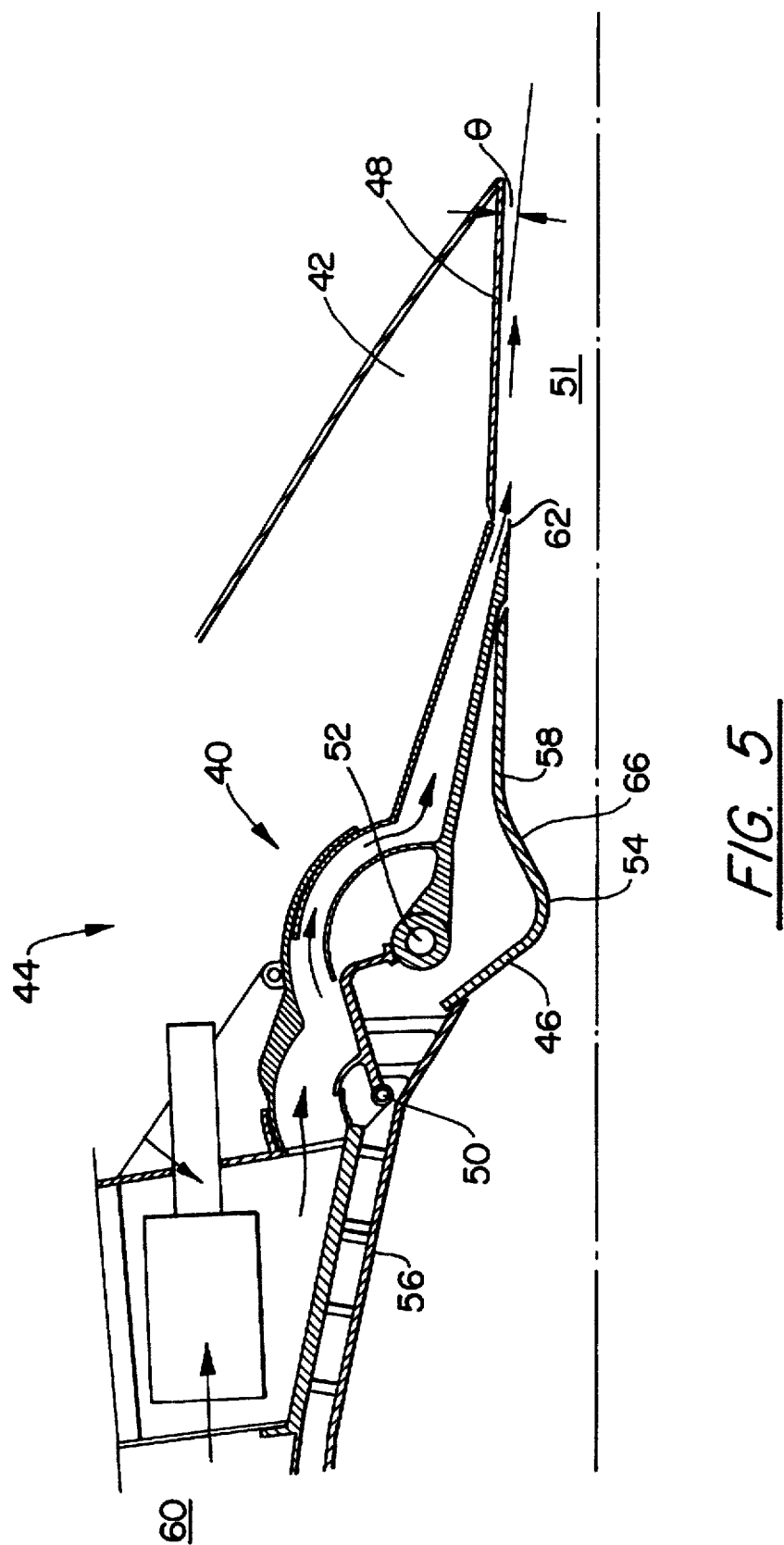
FIG. 5 is a schematic view in section illustrating the exhaust vectoring nozzle of a gas turbine engine utilizing this invention.

FIG. 5 exemplifies a particular application where this invention can be incorporated to enhance the performance of the ejector to improve the cooling effectiveness for cooling the divergent surfaces of a vectoring exhaust nozzle of a gas turbine engine. As shown in FIG. 5 the ejector generally illustrated by reference numeral 40 serves to pump the secondary ram air by the local over expansion characteristics of main gas stream and the momentum exchange between the two fluids for cooling the divergent surfaces 51 and 48 of the vectoring exhaust two-dimensional nozzle generally indicated by reference numeral 44. This type of vectoring nozzle is described in U.S. Pat. No. 4,690,329 granted to William M. Madden on Sep. 1, 1887 entitled "Exhaust Nozzle Coupled with Reverser Exhaust Door" and commonly assigned to United Technologies Corporation which is incorporated herein for reference. For the sake of convenience and simplicity only a portion of the convergent flaps 46 and divergent flap 48 are shown. Suffice it to say that the convergent flap 46 and divergent flap 48 are pivotally connected by hinges 50 and 52 and define with the side wall 51 a two dimensional nozzle that can be articulated to vary the throat 54 to change its area for certain engine operations and vary the direction of the exhaust gases to vector the aircraft. The main engine gases (gas path) flow from the transition duct 56 which is circular in cross section to the two dimension nozzle which is square or rectangular in cross section where it discharges into ambient. As mentioned in the above, the purpose of the cooling extension 58 is to enhance the cooling performance of the ejector 40. The secondary air which is ram air obtained from the nacelle's bay discharges from the secondary passage 60 through slot 62 where it is coalesced to form a film of cooling air to form a sheet of cooling air over the interior surface of the shroud 42. The purpose of the contour 66 of cooling extension 58 as was explained in detail in the above paragraphs, is to further enhance the performance of the ejector 40 by ensuring that the velocity of the primary gas stream (gas path) at the injection site where the secondary air stream discharges from the slot 62 is increased to reduce its static pressure to match the static pressure of the secondary air and that the position of the shock system occurs upstream of the slot 62. As is apparent from an inspection of FIG. 5, the divergent angle θ is held to a minimum and as close to zero degrees as possible.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. A supersonic ejector having a passage for flowing primary gas stream and another passage for flowing secondary gas stream, a throat disposed in the primary gas stream, a cooling extension defining a slot axially extending from said throat, the improvement comprising a contour on said cooling extension extending into the primary stream for accelerating the velocity of the primary gas stream to approximately match the static pressure of the secondary gas stream and contain the expansion shock waves upstream of said slot relative to the flow of said secondary gas stream.

2. A supersonic ejector as claimed in claim 1 wherein said contour is configured to flow the primary stream to be parallel to the secondary stream at the point of injection.

3. A supersonic ejector having a passage for flowing primary gas stream and another passage for flowing secondary gas stream, a throat disposed in the primary gas stream, a cooling extension defining a slot axially extending from said throat, the improvement comprising a contour on said cooling extension extending into the primary stream for accelerating the velocity of the primary gas stream to approximately match the static pressure of the secondary gas stream, contain the expansion shock waves upstream of said slot relative to the flow of said secondary gas stream and direct the flow of the primary stream parallel to the secondary stream at the point of injection.

4. For an exhaust nozzle of a gas turbine engine in combination with a supersonic ejector, said exhaust nozzle having a shroud adjacent said supersonic ejector and the flow discharging from a slot of the ejector cooling said shroud, said supersonic ejector defining a secondary passage in communication with a coolant, said slot being adjacent the gas path of said engine for defining a primary stream for providing local expansion characteristics and momentum exchange, a throat extending into the gas path upstream of said slot, a cooling extension forming a portion of said ejector extending said slot axially downstream from said throat, a contour formed on said cooling extension extending into said primary stream for accelerating said primary stream and holding the expansion shocks upstream of said slot.

5. For an exhaust nozzle as claimed in claim 4 wherein said exhaust nozzle includes a divergent flap and convergent flap.

6. For an exhaust nozzle as claimed in claim 5 wherein said exhaust nozzle includes a two-dimensional vectoring nozzle.

7. For an exhaust nozzle as claimed in claim 6 wherein said shroud and said slot of the ejector are disposed in line relative to each other and the divergence between the shroud and slot is approximately zero degrees.

* * * * *